United States Patent
Marcoccia et al.

(12)

(10) Patent No.: US 6,169,761 B1
(45) Date of Patent: Jan. 2, 2001

(54) METHOD AND TRANSCEIVER USING AN IMPROVED PROTOCOL FOR A FREQUENCY HOP COMMUNICATION SYSTEM

(75) Inventors: Roberto R. Marcoccia, San Jose; George R. Sosnowski, Santa Clara, both of CA (US)

(73) Assignee: Wavespan Corporation, Mountain View, CA (US)

(*) Notice: Under 35 U.S.C. 154(b), the term of this patent shall be extended for 0 days.

(21) Appl. No.: 09/053,412

(22) Filed: Apr. 1, 1998

(51) Int. Cl.[7] ................. A61F 2/06; H04L 27/30
(52) U.S. Cl. ............. 375/132; 375/326; 375/334; 455/226.1
(58) Field of Search .................. 375/130, 132, 375/133, 224, 219, 220, 222, 227, 228, 260, 259, 261, 272, 273, 279, 285, 329, 330, 334, 349; 455/226.1, 226.2; 329/304, 315, 345, 300; 332/103

(56) References Cited
U.S. PATENT DOCUMENTS

| | | | |
|---|---|---|---|
| 5,214,641 | * | 5/1993 | Chen et al. . |
| 5,245,633 | * | 9/1993 | Schwartz et al. . |
| 5,408,506 | * | 4/1995 | Mincher et al. ............... 375/356 |
| 5,594,949 | * | 1/1997 | Anderson et al. ............. 455/62 |
| 5,864,759 | * | 1/1999 | Tat ........................... 455/437 |
| 6,021,314 | * | 2/2000 | Magana et al. ............... 455/62 |
| 6,047,175 | * | 4/2000 | Trompower .................. 455/422 |

* cited by examiner

*Primary Examiner*—Chi H. Pham
*Assistant Examiner*—Jean B. Corrielus
(74) *Attorney, Agent, or Firm*—Menlo Patent Agency LLC (57) ABSTRACT

A frequency hopping transceiver having a protocol for selecting a clear channel for exchanging QAM payload data signals. An energy level in a current channel is sounded by to determine whether it is clear or busy. When the current channel is clear an outgoing frequency shift key (FSK) handshake signal is transmitted. When the current channel is busy or an incoming handshake signal is not received, the transceiver hops to the next channel without waiting until the dwell time has elapsed for the current channel. When a channel is clear and the FSK handshake signal is received the transceiver uses a differential synchronization time for exchanging QAM acquisition signals and payload data in unison.

49 Claims, 8 Drawing Sheets

METHOD AND TRANSCEIVER USING AN IMPROVED PROTOCOL FOR A FREQUENCY HOP COMMUNICATION SYSTEM

BACKGROUND OF THE INVENTION

1. Field of the Invention

The invention relates generally to radio systems and more particularly to a frequency hopping quadrature amplitude modulation radio system having an improved protocol using frequency shift key modulation for avoiding busy channels.

2. Description of the Prior Art

Government regulatory agencies commonly regulate the radio frequency spectrum by designating certain frequency bands for certain uses. For example, in the United States the Federal Communication Commission (FCC) allocates the frequencies between 5.725 GHz and 5.850 GHz for use as an industrial, scientific, and medical (ISM) band. In order for many users to use the same band and minimize interference between one radio system and another, the FCC requires that all radio transceivers in this band use spread spectrum signals. Two techniques are commonly used for generating such signals—direct sequence using a spreading code or frequency hopping among frequency channels. Well-known examples of direct sequence spread spectrum are the global positioning system (GPS) and code division multiple access (CDMA) cellular phone systems. However, a problem with direct sequence spreading radio systems is that the limited isolation between spreading codes places a limitation on the number of non-interfering signals that can use the same band. On the other hand the use of frequency hopping requires that several issues that are particular to frequency hopping techniques must be resolved.

A frequency hopping radio system must have a protocol for avoiding or recovering from an interfering signal in a particular channel. Existing radios use an 802.11 Ethernet protocol that calls for testing that a frequency channel is clear before transmitting on that channel. When the channel is busy, it is re-tested at random times until it becomes clear. In existing radios, when a channel is busy, the radio dwells on the channel until the time for hopping to the next frequency channel. Such protocol limits the throughput of the radios in a communication system. A further limitation of an Ethernet type protocol is that although the channel may be clear at the transmit end of a link, it may be busy at the receive end.

The transceivers on each end of a frequency hopping radio system must hop in unison. Therefore, time must be synchronized between separated transceivers. Existing systems send time messages from a master transceiver to calibrate time in slave transceivers to match an accurate time in the master. However, maintaining an accurate time clock is expensive and such messages may need to be sent frequently, thereby decreasing throughput.

In order to maximize throughput within an allowable bandwidth, it is necessary to use a high order modulation having multiple bits of information carried by each modulation state. Existing transceivers use a type of modulation known as quadrature amplitude modulation (QAM) having in-phase (I) and quadrature phase (Q) components. However, higher order QAM modulations such as 256 QAM require more effective protocols and more accurate timing in order to acquire the QAM signal. There is a need for resolving these issues that are particular to frequency hop radio systems in order to improve the throughput of these systems without causing or being susceptible to interfering signals.

SUMMARY OF THE INVENTION

It is therefore an object of the present invention to provide a spread spectrum frequency hopping communication system, a transceiver, and a method having an improved protocol for avoiding unusable channels by selecting a next channel in a frequency hop sequence before a specified dwell time has elapsed.

Another object of the present invention is to use a simple and robust modulation for exchanging handshake signals on a channel in preparation for using high order QAM modulation for exchanging payload signals on that channel.

Another object of the present invention is to use a differential time for frequency hopping synchronization.

Briefly, in a preferred embodiment, a communication system of the present invention includes two nearly identical frequency hopping 256 QAM transceivers communicating with each other in a radio frequency (RF) range having a low band of 5.727 to 5.768 GHz and a high band of 5.806 to 5.847 GHz. When a transceiver is receiving on the high band it is transmitting on the low band and vice versa. One transceiver is designated as a master and the other as a slave. The master and slave frequency hop in unison using the same frequency hop table including frequency channel pairs of transmit and receive frequencies. When the master is using the transmit frequency of the channel, the slave is using the receive frequency of the channel and vice versa. The channel pairs are arranged so that both the transmit frequencies and the receive frequencies occur in a pseudo-random order. The specified dwell time for exchanging signals on each channel is not longer than four-hundred milliseconds in order to meet a Federal Communications Commission (FCC) regulation for a spread spectrum signal.

A transceiver of a preferred embodiment includes an outdoor unit and an indoor unit. The outdoor unit includes an antenna for radiating and receiving signals, an RF splitter for separating the low band signals from the high band signals in order to isolate the receive signals from the transmit signals and up and downconverters for converting the frequencies of transmit (TX) and receive (RX) intermediate frequency (IF) channel signals to the frequencies of the channels of the RF TX and RX signals, respectively. An RF transmit channel is determined by an IF transmit channel and the RF band; and an RF receive channel is determined by the IF receive channel and the RF band.

The indoor unit includes an intermediate frequency (IF) section, a modem section, and a digital section. The IF section includes a TX IF upconverter coupled to a TX IF downconverter for upconverting a low IF TX signal to the TX IF channel signal; and an RX IF upconverter coupled to a RX IF downconverter for downconverting the RX IF channel signal to a low IF RX signal. A local oscillator frequency shift key (LO/FSK) generator provides a local signal to the TX IF upconverter for generating a handshake signal and upconverting the low IF TX signal to a high IF TX signal. A TX direct digital synthesizer (DDS) provides a local signal to the TX IF downconverter for selecting the TX IF frequency channels and downconverting the high IF TX signal to the TX IF channel signal. An RX DDS provides a local DDS signal to the RX IF upconverter for tuning to the RX IF frequency channels and upconverting the RX IF channel signal to a high IF RX signal. An IF local oscillator provides an LO signal to the RX IF downconverter for downconverting the high IF RX signal to the low IF RX signal. An FSK demodulator non-coherently demodulates an incoming handshake signal and a receive signal strength indication (RSSI) detector measures an RSSI from the high IF RX signal.

The modem section includes a quadrature amplitude (QAM) modulator for generating a digital TX signal having CW or four to two-hundred fifty-six IQ states and an interpolator/DAC for converting the digital TX signal to he low IF TX signal. A digitizer converts the low IF RX signal to a digital RX signal and a QAM demodulator demodulates the digital RX signal having four to two-hundred fifty-six IQ states. A reference oscillator provides a reference frequency to the QAM modulator, the LO/FSK generator, the TX DDS, the RX DDS, and the IF local oscillator.

The digital section includes a processor system including an executable code for directing a microprocessor for controlling the elements of the transceiver. The executable code includes a rendezvous protocol code, an initial frequency calibration protocol code, and a frequency hop protocol code. The rendezvous protocol code establishes initial contact and determines a transit time. The initial frequency calibration protocol code establishes communication on two channels for determining carrier frequency errors. The frequency hop protocol code uses the pseudorandom frequency hop table for selecting a channel for exchanging signals for the specified dwell time on that channel, selecting a next channel for exchanging signals on that channel, and so on continuously. The pseudorandom order for the transmit and receive frequencies of the frequency hop table and the relatively short time period of the specified dwell time ensure that the signals are spread spectrum. The protocols in the rendezvous, initial frequency calibration, and frequency hop protocol code sound a frequency channel to determine whether the channel is clear by comparing an RSSI measurement to a clear channel assessment (CCA) threshold. When the master and slave transceivers determines that their respective channels are clear, the master transmits an FSK handshake signal and the slave responds with an FSK handshake signal. When the channel is determined by both transceivers to be clear and the FSK handshake signals have been received the master and slave begin a QAM signal acquisition on the channel. When the channel is determined to be busy by either the master or the slave transceiver, or the master or slave transceiver does not receive the incoming handshake signal within a short time out period, both the master and the slave transceiver go to the next channel in the same frequency hop table stored in each transceiver without waiting until the specified dwell time for the current channel has elapsed. A differential synchronization time of a multiple of the transmit time is used by both the master and the slave for synchronizing the start of the QAM signal acquisition at a differential time after the master transmits and the slave receives the handshake signal, thereby relaxing a requirement that time in one transceiver is the same as time in the other transceiver or has a low relative drift rate.

An advantage of the present invention is that a high effective data rate is achieved in a frequency hopping communication system, a transceiver, and a method by rapidly avoiding unusable channels.

Another advantage of the present invention is that a handshake signal using a simple robust modulation having a high likelihood of being received is exchanged in preparation for exchanging QAM modulation payload data signals having a high data rate.

Another advantage of the present invention is that a differential time is used for frequency hopping synchronization.

These and other objects and advantages of the present invention will no doubt become obvious to those of ordinary skill in the art after having read the following detailed description of the preferred embodiments which are illustrated in the various figures.

BRIEF DESCRIPTION OF THE DRAWINGS

FIG. 4b is a flow chart of a method for avoiding channels having a high level of interfering signals in the system and transceiver of FIG. 1 using the method of FIG. 4a;

FIG. 5 is a flow chart of a rendezvous protocol for establishing a communication link in the system and transceiver of FIG. 1 using the method of FIG. 4a;

FIG. 6 is a flow chart of an initial frequency calibration protocol in the system and transceiver of FIG. 1 using the method of FIG. 4a; and FIG. 7 is a flow chart of a frequency hopping protocol in the system and transceiver of FIG. 1 using the method of FIG. 4a.

DETAILED DESCRIPTION OF THE PREFERRED EMBODIMENTS

Figure 1:
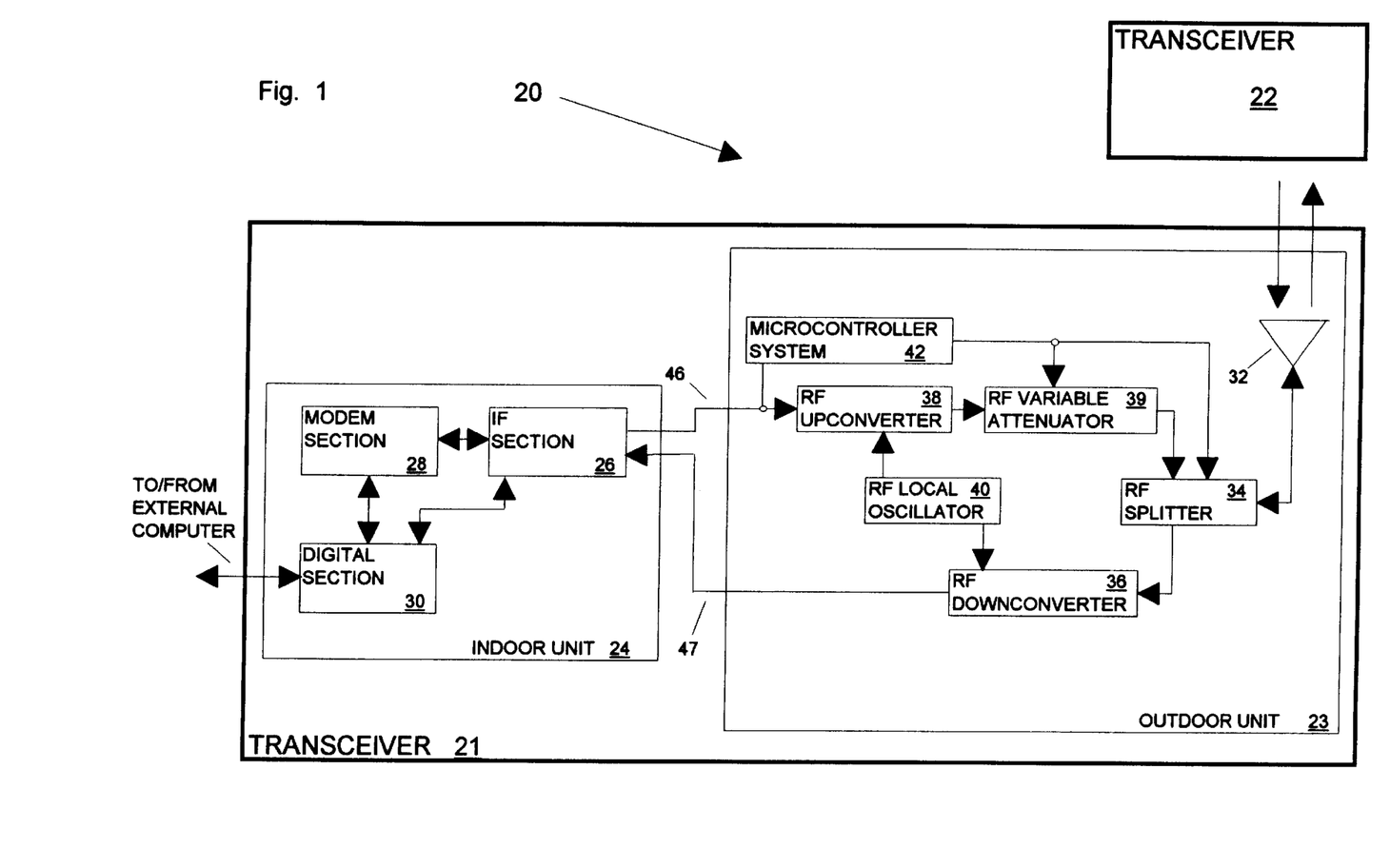
FIG. 1 is a block diagram of a frequency hopping communication system and a transceiver of the present invention.

FIG. 1 is a block diagram of a spread spectrum frequency hopping communication system of the present invention referred to by the general reference number 20. The system 20 includes frequency hopping transceivers 21 and 22. The transceivers 21 and 22 communicate with each other in a two-way link by frequency hopping among pseudorandomly ordered frequency channels with a specified dwell time of about but not more than four-hundred milliseconds on each channel in order to meet a Federal Communications Commission (FCC) regulation for a spread spectrum signal. One of the transceivers 21 or 22 is designated as the master and other as the slave. The detailed descriptions below of the transceiver 21 apply equally to the transceiver 22 and to both the master and the slave unless it is otherwise indicated.

The transceiver 21 includes an outdoor unit 23 for receiving and transmitting a radio frequency (RF) signal and an indoor unit 24 including an intermediate frequency (IF) section 26, a modem section 28, and a digital section 30. The outdoor unit 23 includes an antenna 32, an RF splitter 34, an RF downconverter 36, an RF upconverter 38, an RF variable attenuator 39, an RF local oscillator 40, and a microcontroller system 42. The antenna 32 receives a receive (RX) and transmits a transmit (TX) airwave channel RF signal, and issues and receives respective representative conducted RX RF and TX RF channel signals to the splitter 34. The splitter 34 splits and isolates the RF signal path of the conducted signals for issuing the RX RF channel signal to the RF downconverter 36 and receiving the TX RF channel signal from the RF upconverter 38 through the RF variable attenuator 39. The RF local oscillator 40 provides a local oscillator (LO) signal having a frequency of about 5787 MHz to the RF downconverter 36 for frequency downconverting the RX RF channel signal to an RX IF channel signal and to the RF upconverter 38 for frequency upconverting a TX IF channel signal to the TX RF channel signal.

The RX and TX RF channel signals have a high band and a low band. In a preferred embodiment, the low band of the RF signal has a frequency range of about 5727 to 5768 megahertz (MHz), the high band has a frequency range of about 5806 to 5847 MHz, and the TX and RX IF channel signals are issued and received in one megahertz channels from nineteen megahertz to sixty megahertz. When the RX RF channel signal uses the low band the TX RF channel signal uses the high band, and vice versa. The splitter 34 uses a diplexer to isolate the RX RF channel signal from the TX RF channel signal by separating signals in the high band from signals in the low band. In order to switch the TX RF or RX RF channel signal between bands, the high and low band outputs of the diplexer are switched under control of the microcontroller system 42. The RF variable attenuator 39 is controlled by the microcontroller system 42 for setting a selected nominal output power level to the antenna 32.

A coaxial cable 46 carries the TX IF channel signal from the indoor unit 24 to the outdoor unit 23 and a coaxial cable 47 carries the RX IF channel signal from the outdoor unit 23 to the indoor unit 24. The microcontroller system 42 includes a microcontroller for controlling and receiving information from the elements of the outdoor unit 23, a universal asynchronous synchronous receiver transmitter (UART) for communicating with the indoor unit 24, and a memory. Although a preferred embodiment of the transceiver 21 transmits and receives signals for two-way communication, the scope of the ideas in the present invention can be reduced for a radio for transmitting or receiving signals for one-way communication.

Figure 2:
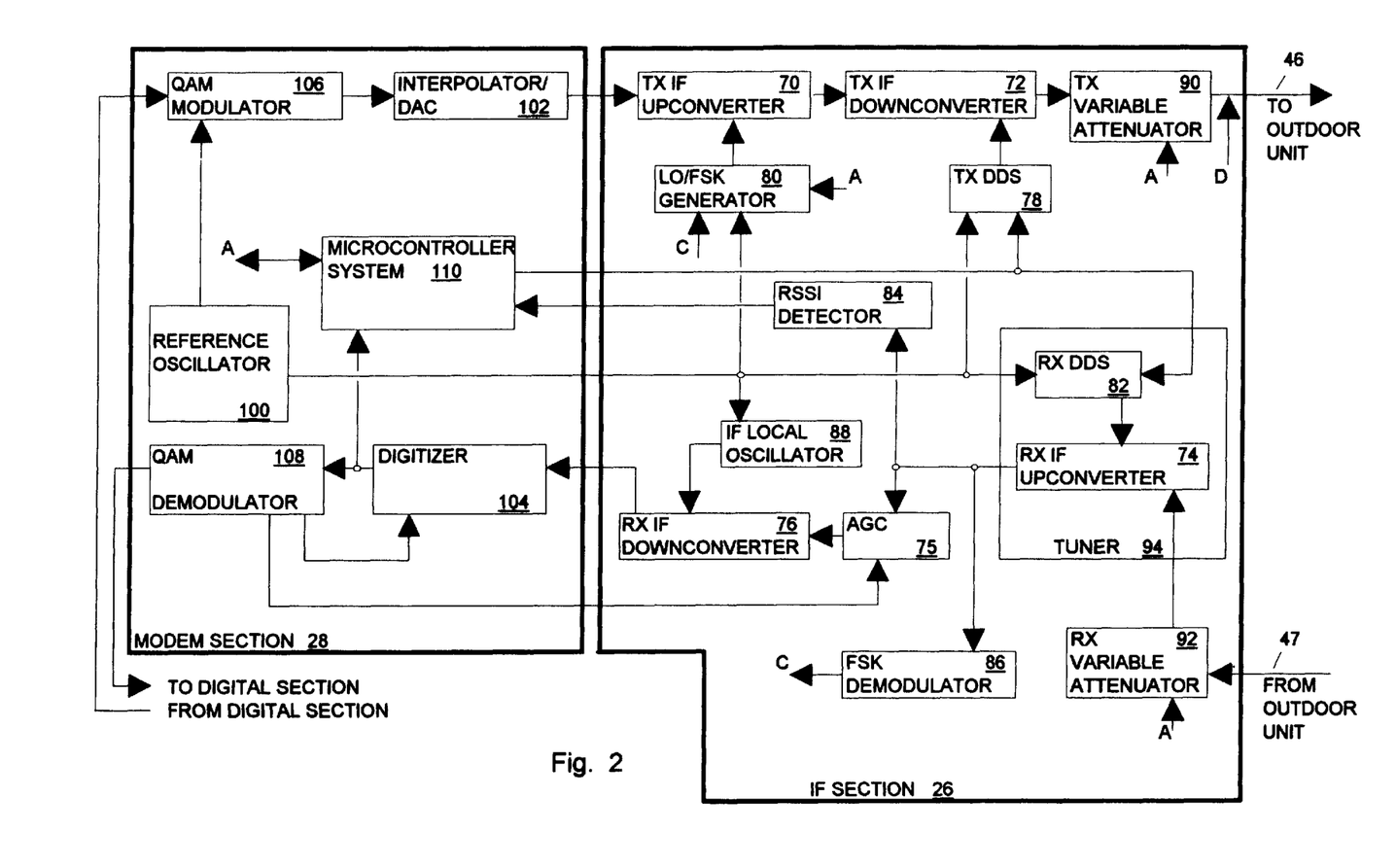
FIG. 2 is a block diagram of an intermediate frequency (IF) section and a modem section of the transceiver of FIG. 1.

FIG. 2 is a block diagram of the IF section 26 and the modem section 28 of the indoor unit 24. The IF section 26 includes a TX IF upconverter 70, a TX IF downconverter 72, an RX IF upconverter 74, an AGC amplifier 75, an RX IF downconverter 76, a TX direct digital synthesizer (DDS) 78, a local oscillator/frequency shift key (LO/FSK) generator 80, a RX DDS 82, a receive signal strength indication (RSSI) detector 84, an FSK demodulator 86, a IF local oscillator 88, and TX and RX variable attenuators 90 and 92. The LO/FSK generator 80 includes a voltage controlled oscillator (VCO) for generating an output signal at about 73.33 megahertz and a receives a mode signal on a line A for controlling whether the output signal is a CW signal or an FSK modulated signal. The VCO is locked to a reference frequency signal provided by the modem section 28. A baseband FSK modulation signal having handshake information is provided by the digital section 30 on a line C for modulating the VCO for providing the FSK modulated signal. The LO/FSK generator 80 issues its output signal to the TX IF upconverter 70 for upconverting the frequency of a low IF TX signal received from the modem section 28 at a frequency that is a multiple of the system baud rate to a high IF TX signal at about seventy megahertz. The TX IF upconverter 70 then filters the upconverted signal preferably with a surface acoustic wave (SAW) filter and passes the filtered signal to the TX IF downconverter 72.

The TX IF downconverter 72 uses a TX DDS signal at a frequency of about eighty-nine to one-hundred thirty megahertz in about one megahertz increments from the TX DDS 78 for downconverting the high IF TX signal to the TX IF channel signal at a frequency of nineteen to sixty megahertz in corresponding one megahertz frequency channel increments. The TX IF downconverter 72 then filters the downconverted signal and passes the filtered signal through the TX variable attenuator 90 as the TX IF channel signal to the RF upconverter 38 (FIG. 1) in the outdoor unit 23. The TX DDS 78 synthesizes frequencies in the TX DDS signal for setting the transmit frequency for the selected channels from a reference frequency signal from the modem section 28 and a TX DDS control signal from the modem section 28.

The RX IF upconverter 74 uses an RX DDS signal from the RX DDS 82 for upconverting the RX IF channel signal received through the RX variable attenuator 92 from the RF downconverter 36 (FIG. 1) in the outdoor unit 23 at about nineteen to sixty megahertz in one megahertz channel increments to a high IF RX signal at about seventy megahertz, filters the downconverted signal preferably with a SAW device, and passes the filtered signal to the AGC 75. The RX DDS 82 uses the reference frequency signal and a receive frequency adjustment signal from the modem section 28 for synthesizing the frequencies of the RX DDS signal for setting the receive frequency for the selected channel and adjusting the receive frequency to compensate for frequency errors in both transceivers 21 and 22. The combination of the RX DDS 82 and the RX IF upconverter 74 act as a tuner 94 for tuning to the receive frequency of the RX IF channel signal and providing a representative tuned signal as the high IF RX signal. The AGC 75 uses an amplifier and a variable attenuator for controlling the level of the high IF RX signal according to a control signal received from the modem section 28 and passes the signal to the RX IF downconverter 76. The RX IF downconverter 76 uses an IF LO signal from the IF local oscillator 88 at about 69.167 megahertz for downconverting the high IF RX signal to a low IF RX signal at about the system baud rate and passes the signal to the modem section 28. The IF local oscillator 88 uses a VCO locked to the reference frequency signal for generating the IF LO signal.

The FSK demodulator 86 uses a frequency discriminator for demodulating FSK handshake modulation from the high IF RX signal and passing a baseband signal having the demodulated handshake information to the digital section 30 on the line C. A relatively wide frequency deviation, preferably about 625 kilohertz, enables the FSK demodulator 86 to use non-coherent demodulation, thereby eliminating a need for phase locking or otherwise recovering a carrier frequency for determining that the handshake signal has arrived and recovering the handshake information. In a preferred embodiment the rate of the FSK modulation is half of the frequency deviation. Alternatively, a phase detector can be used in place of the FSK demodulator 86 where the phase detector compares a phase of an incoming binary phase shift key (BPSK) handshake signal to a phase of the incoming handshake signal at a previous time. The phase comparison may be taken for a single or a sequence of several incoming symbols. In-phase (I) and quadrature phase (Q) phase detectors may be used for a QPSK handshake signal. Similarly, for generating an outgoing BPSK or QPSK handshake signal, the TX IF upconverter 70 may be replaced by a BPSK or QPSK phase modulator and the LO/FSK generator 80 may be replaced by one or two baseband signal drivers and one or I and Q LO signals.

The RSSI detector 84 measures the signal level of the high IF RX signal and passes the RSSI measurement information to modem section 28. A suitable circuit for the RSSI detector 84 is a model LMX2240 commercially available from National Semiconductor Corporation of Santa Clara, Calif. The TX variable attenuator 90 and the RX variable attenuator 92 receive control signals on the line A for controlling the levels of the TX IF and the RX IF channel signals, respectively. Operating information is passed between the digital section 30 and the outdoor unit 23 through a modulator and demodulator in the IF section 26, the line D, and the cable 46.

The modem section 28 includes a reference oscillator 100, an interpolator/digital-to-analog converter (DAC) 102, a digitizer 104, a quadrature amplitude modulation (QAM)

modulator 106, a QAM demodulator 108, and a microcontroller system 110. The reference oscillator 100 provides the reference frequency signal at about one-hundred forty megahertz used in the IF section 26 and the QAM modulator 106. The QAM modulator 106 receives a TX data byte stream from the digital section 30 and provides a digital TX signal having in-phase (I) and quadrature phase (Q) states corresponding to the data bits. A mode control signal from the digital section 30 selects the modulation mode for the low TX IF channel signal as QPSK (also known as 4 QAM), 16 QAM, 64 QAM, or 256 QAM. The QAM modulator 106 includes frequency dividers to divide the frequency of the reference frequency signal to a multiple of the baud rate. The TX data byte stream is oversampled at the baud rate multiple and issued in the digital TX signal to the interpolator/DAC 102. The interpolator/DAC 102 interpolates the digital TX signal and converts the interpolated digital signal to analog for providing the analog low IF TX signal to the TX IF upconverter 70. In a preferred embodiment, the QAM modulator 106 includes a BCM 3023 circuit commercially available from Broadcom Corporation of Irvine, Calif. and uses a field programmable gate array (FPGA) commercially available Altera Corporation of San Jose, Calif., for dividing the reference signal in order to sample the TX data byte stream according to the baud rate. The interpolator/DAC 102 oversamples the digitized IF TX signal to provide the analog low IF TX signal.

The digitizer 104 uses an analog-to-digital converter (ADC) to digitize the analog low IF RX signal and pass a digital RX signal to the QAM demodulator 108. The QAM demodulator 108 includes an adaptive equalizer for minimizing intersymbol interference and IQ crosstalk and a lock detector. The lock detector provides a demodulation lock indicator signal when the QAM demodulator 108 is properly adjusted for demodulating the digital RX signal. Preferably, the QAM demodulator 108 includes a model BCM 3100 circuit commercially available from Broadcom Corporation, a VCO controlled by the BCM 3100 for clocking the digitizer 104 at the correct baud rate, and a model 9480 logic circuit commercially available from Altera Corporation and programmed for measuring the mean magnitude of the errors in the demodulated states in the QAM signal. Lock is indicated by the QAM demodulator 108 by the AND condition when the mean magnitude of the differences between the demodulated states in the QAM signal and the ideal states is less than a selected IQ threshold and a main equalizer tap in the Broadcom 3100 is greater than one-eighth the maximum value. The QAM demodulator 108 uses a QAM demodulator control signal from the digital section 30 for selecting the mode, demodulating the digital RX signal and passing a serial RX data signal to the digital section 30.

The microcontroller system 110 includes an analog-to-digital converter (ADC) for receiving the RSSI measurements from the RSSI detector 84 in analog form and passing digitized RSSI measurements on the line A to the digital section 30. The digital section 30 compares the RSSI of the noise floor at each frequency hop against a clear channel assessment (CCA) threshold based upon a previous RSSI measurement indicative of the received signal level (RSL) when the same channel was successfully used. For communicating on the line A, the microcontroller system 110 includes a dual ported random access memory (RAM). The modulation mode control signals from the digital section 30 control the QAM modulator 106 and the QAM demodulator 108 for generating and demodulating, respectively, a QPSK signal having a base bit rate of twice the system baud rate, a 16 QAM signal having a bit rate of four times the baud rate, a 64 QAM signal having a bit rate of six times the baud rate, or a 256 QAM signal having a bit rate of eight times the baud rate. QAM modulator 106 issues and the QAM demodulator 108 receives four digitized samples for each IQ symbol in the digital TX and RX signals, respectively. Although the present invention is described in terms of the standard QAM formats of QPSK (4 QAM), 16 QAM, 64 QAM, and 256 QAM other formats having intermediate numbers of modulation states, higher order modulation states, and/or constellation patterns that are not square are within the scope of the present invention.

Figure 3:
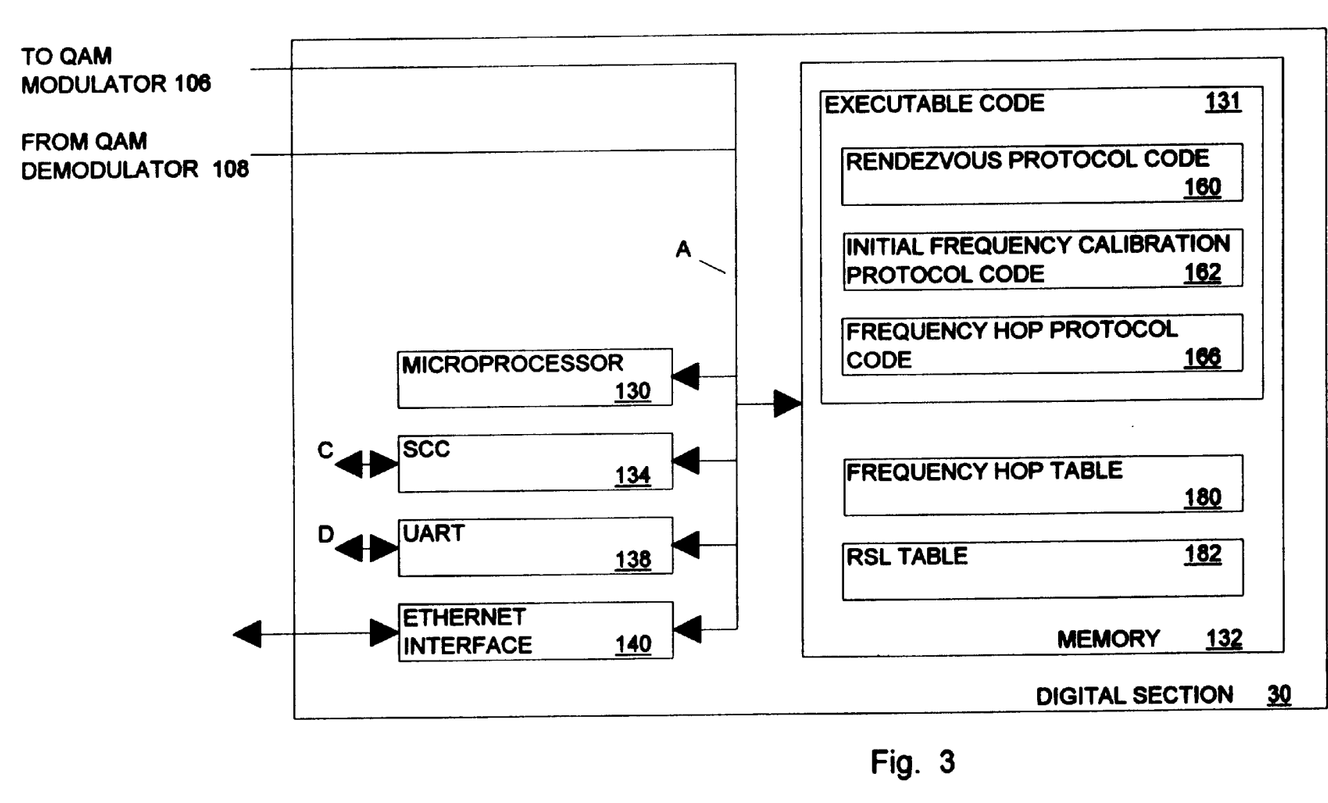
FIG. 3 is a block diagram of a digital section of the transceiver of FIG. 1.

FIG. 3 is a block diagram of the digital section 30 of the indoor unit 24. The digital section 30 includes a microprocessor 130 that operates in a conventional manner for reading executable code 131 and data from a memory 132, writing variable data to the memory 132, and controlling and reading information from a serial communications controller (SCC) 134, a universal asynchronous/synchronous receiver transmitter (UART) 138, an Ethernet interface 140, and other elements of the transceiver 21 over a microprocessor bus on the line A.

The executable code 131 includes a rendezvous protocol code 160, an initial frequency calibration protocol code 162, and a frequency hop protocol code 166. The variable data includes a frequency hop table 180 and a received signal level (RSL) table 182. Alternatively, the information in the tables may be stored in the form of equations.

The SCC 134, preferably a model 8530 commercially available from Zilog Corporation of Campbell, Calif., provides the baseband modulation signal to the LO/FSK generator 80 and receives the demodulated signal from the FSK demodulator 86 on the line C. The UART 138 communicates through a modulator and demodulator in the IF section 26, the line D, and the cable 46 to the outdoor unit 23. The Ethernet interface 140 communicates with an external computer or other users for receiving and issuing control information and the payload data that is communicated by the system 20. Preferably, the memory 132 includes flash memory, random access memory (RAM), and electrically programmable read only memory (EPROM).

Figure 5:
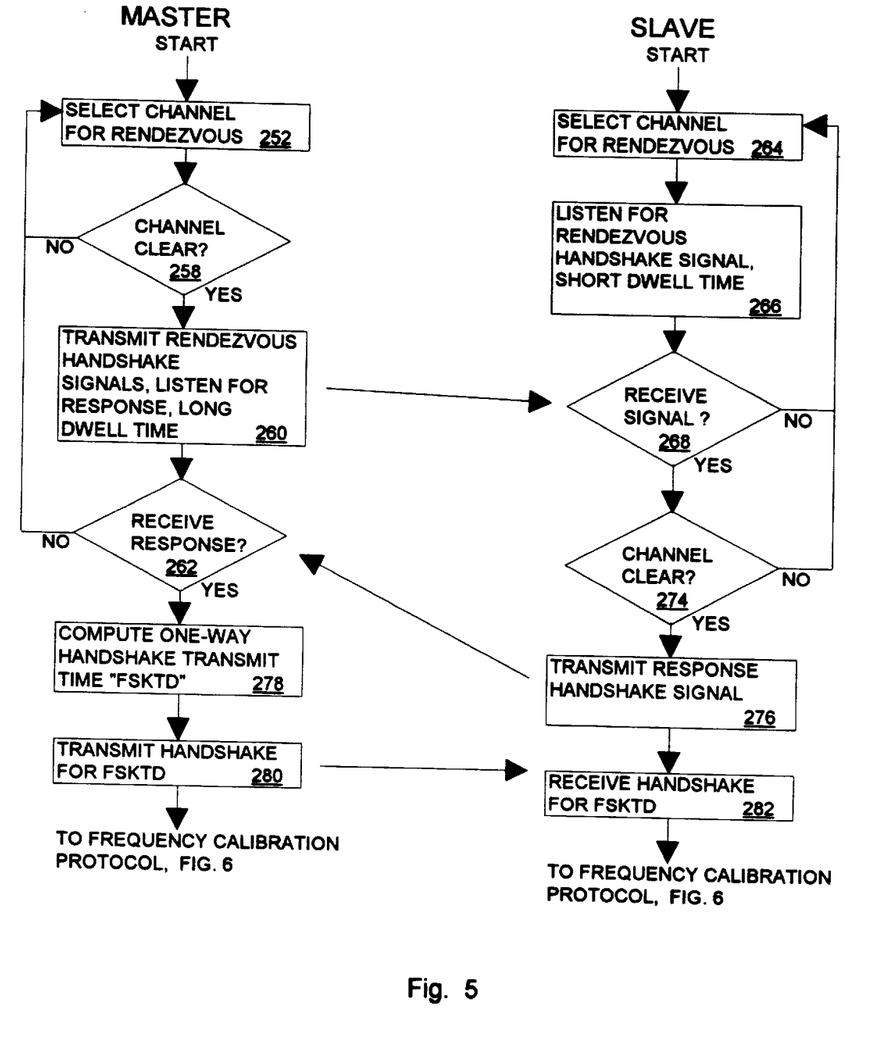

The rendezvous protocol code 160 includes microprocessor instructions for implementing a rendezvous protocol illustrated in FIG. 5 and described in the accompanying detailed description for finding a frequency channel for first establishing a link between the transceivers 21 and 22 and then determining a transit time.

Figure 6:
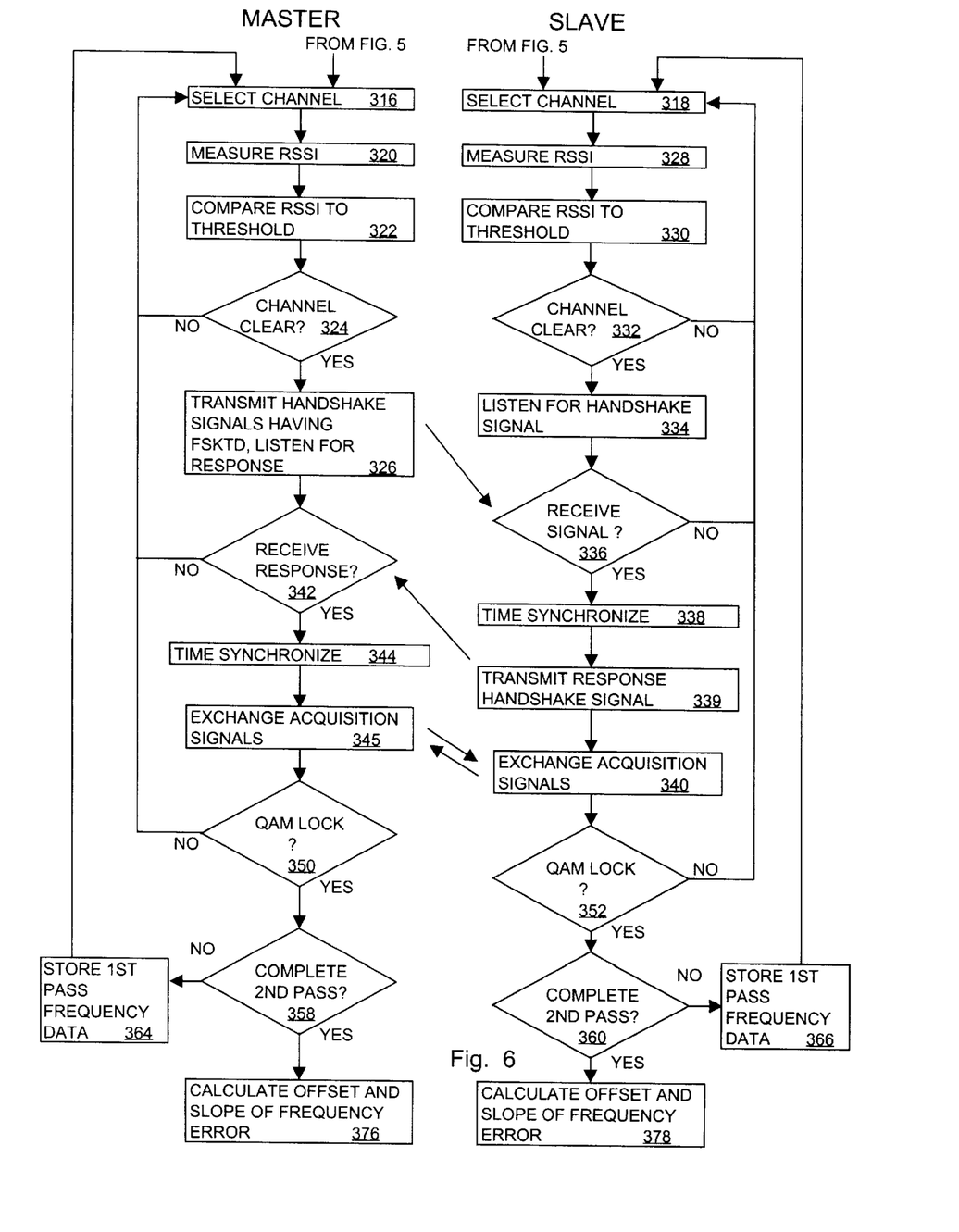

The initial frequency calibration protocol code 162 includes microprocessor instructions for selecting and establishing links on low and high IF frequency channels for determining frequency errors due to the local signals used in transmitting and receiving signals between the transceivers 21 and 22 as illustrated in FIG. 6 and described in the accompanying detailed description.

Figure 7:
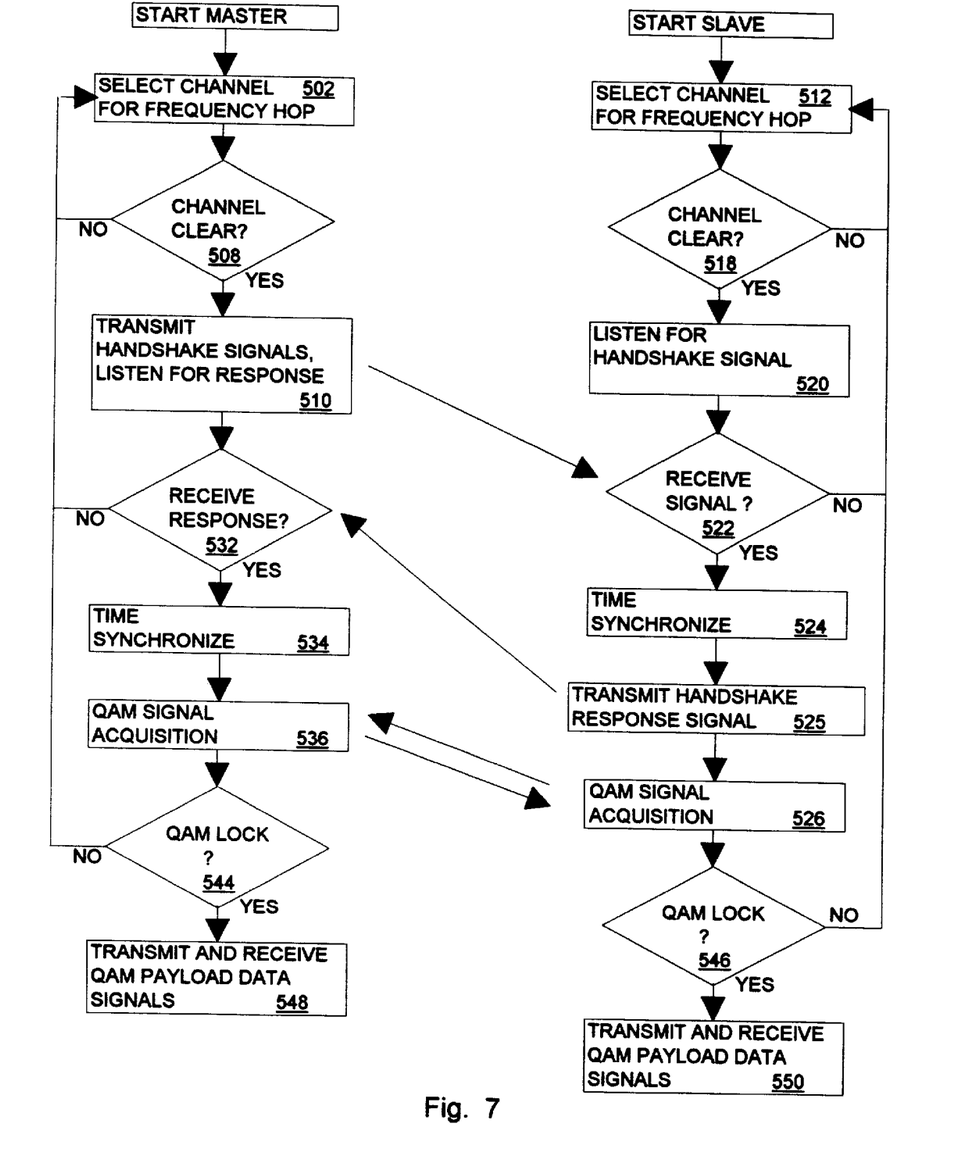

The frequency hop protocol code 166 includes microprocessor instructions for frequency hopping among channels and establishing a communications link on each channel as illustrated in FIG. 7 and described in the accompanying detailed description.

The frequency hop table 180 includes information for the channel pairs for (i) the IF transmit frequency for the TX IF channel signal and the RF band for the TX RF channel signal and (ii) the IF receive frequency for the RX IF channel signal and the RF band for the RX RF channel signal. The channel pairs are then used by the frequency hop protocol code 166 for frequency hopping. The transceivers 21 and 22 are each pre-programmed with the same frequency hop table 180. However, the RF transmit frequency of the transceiver 21 is the RF receive frequency of the transceiver 22 and vice versa. The arrangement of the combinations of IF frequency pairs with RF bands is such that the RF transmit and RF receive frequencies each occur in a pseudorandom order, thereby providing a spread spectrum signal when the transceivers 21 and 22 cycle through the frequency hop table 180.

The RSL table 182 includes the received signal levels (RSL)s used at the start of each frequency hop for determining whether or not the intended current channel is clear. The channel is determined to be clear when an RSSI noise measurement in the channel is lower than the CCA threshold that is computed by subtracting an offset from the RSL. The RSLs are determined by measuring an RSSI while that channel is being used.

Although a preferred embodiment of the present invention uses a processing system that is segmented as the digital section 30, the microcontroller system 42, and the microcontroller system 110 described above, many alternative embodiments using one or several microprocessors and/or microcontrollers, various segmentations, and various interface devices, buses, and interconnections are well-known to those having ordinary skill in the art and within the scope of the invention for performing the processing system functions described above.

Figure 4A:
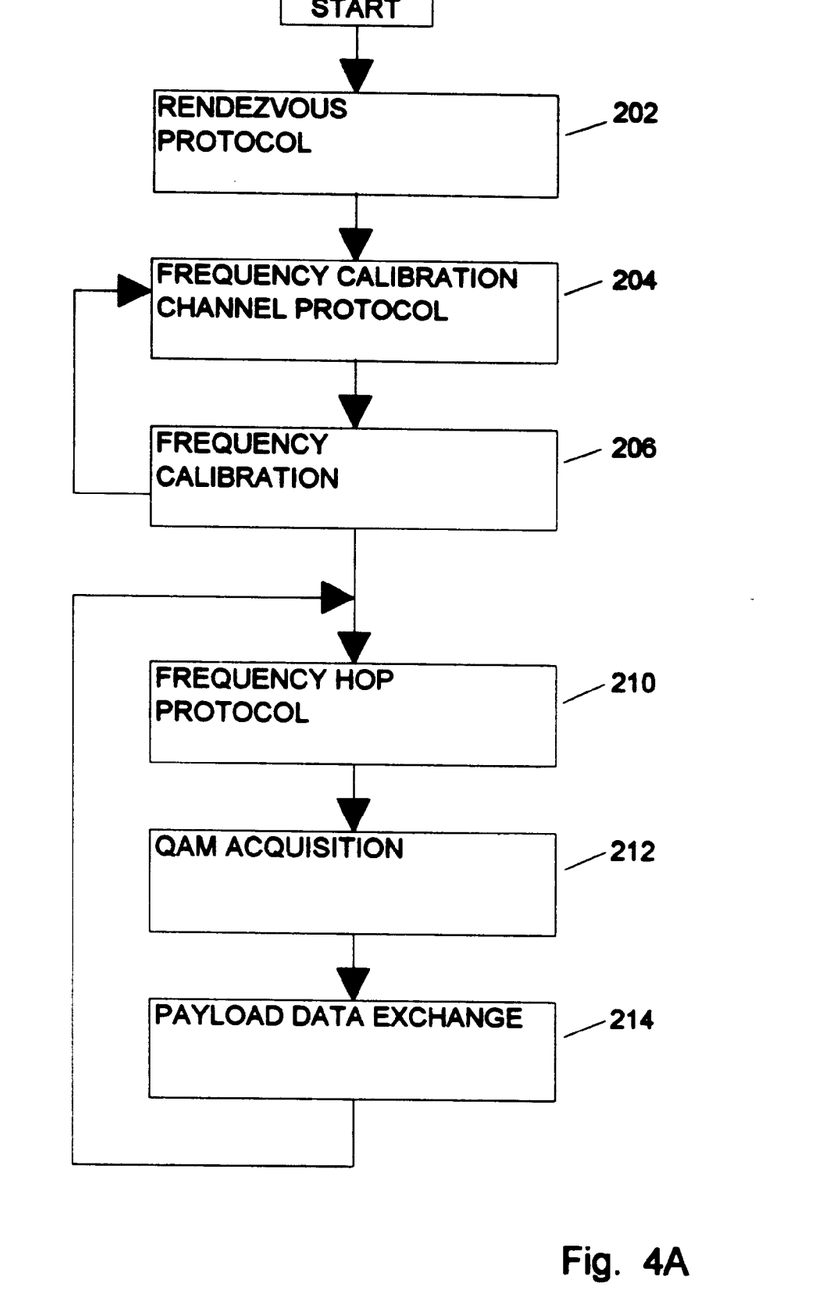
FIG. 4a is a flow chart of an overview of a communication method for the system and transceiver of FIG. 1.

FIG. 4a is a flow chart showing an overview of a method of the present invention using frequency hopping for spread spectrum communication. At the start the transceivers 21 and 22 are installed and turned on, one of the transceivers 21 or 22 is designated as the master and the other as the slave, and the antennas 32 of the transceivers 21 and 22 are spatially aligned. In a step 202 the rendezvous protocol code 160 directs the transceiver 21 and 22 for establishing a communication link by aligning to the same channel in the frequency hop table 180, and then determining a transit time for the transceivers 21 and 22. The step 202 is done only at installation or if the transceivers 21 and 22 lose contact with each other. In a step 204 the initial frequency calibration protocol code 162 directs the transceivers 21 and 22 through two passes in order that both transceivers 21 and 22 receive and transmit using IF frequencies toward the low and the high ends of the IF channel frequency range. The apparent frequencies of the received signals in the selected channels are used in a step 206 for calibrating frequency errors in the transceivers 21 and 22. In a step 210 a frequency hop protocol code 166 directs the transceivers 21 and 22 for selecting a channel for exchanging payload data. In a step 212 the transceivers 21 and 22 issue and acquire QAM signals in preparation for exchanging payload data and in a step 214 the transceivers 21 and 22 exchange payload data. After the specified dwell time for exchanging signals on the current channel, the transceivers 21 and 22 return to the step 210 to select the next channel in a continuous loop. In the detailed descriptions accompanying FIGS. 5–7 below, either of the transceivers 21 or 22 may be designated and referenced as the master transceiver and the other as the slave transceiver. The master and slave transceivers are described for using 256 QAM signals for exchanging payload data. However, the QAM modulator 106 and QAM demodulator 108 may be configured so that the master and slave transceivers may as well exchange payload data using 64 QAM, 16 QAM, and QPSK signals.

Figure 4B:
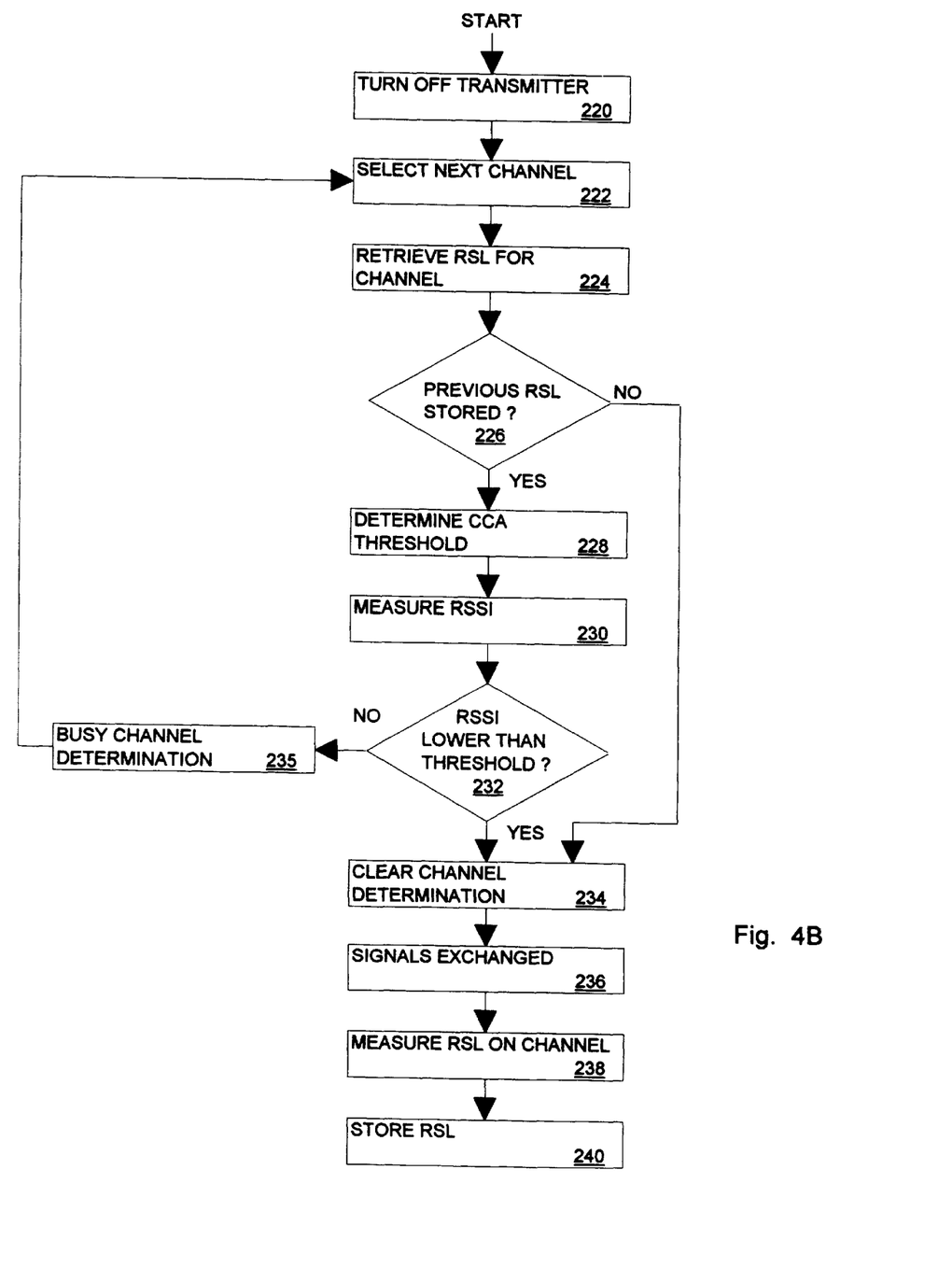

FIG. 4b is a flow chart of a method used in the rendezvous, initial frequency calibration, and frequency hop protocols for avoiding channels on which interfering signals may cause uncorrectable errors in the data that is transmitted between transceivers 21 and 22. This is accomplished using a technique called clear channel assessment (CCA) to look for interfering signals before transmitting on each channel. At a step 220 the transceivers 21 and 22 stop transmitting. At a step 222 the transceivers 21 and 22 select the next channel according to the respective protocol. At a step 224 the transceivers 21 and 22 retrieve a stored value from the RSL table 182 for a received signal level corresponding to an RSSI measurement taken by the RSSI detector 84 during a previous time the selected channel was used. Alternatively, the RSL may be derived from an RSSI measurement taken on the last selected channel or some other channel. At a step 226 when no RSL has been stored, the channel is assumed to be clear at a step 234.

At a step 228 when a stored RSL is available for the channel, the CCA threshold is computed by subtracting a predetermined offset from the RSL. For example, when the RSL is sixty decibels below a milliwatt (−60 dBm) and the predetermined offset is thirty decibels (30 dB), the CCA threshold is ninety decibels below a milliwatt (−90 dBm). In general the magnitude of the offset will depend upon the order and type of modulation with a higher order of modulation such as 256 QAM having a higher offset than a lower order of modulation such as QPSK. The initial frequency calibration and frequency hop protocols use an offset corresponding to the highest order of QAM that is to be acquired. The rendezvous protocol uses an offset for the modulation for the handshake signals. In a preferred embodiment using the FSK modulation described above, the offset for the FSK modulation is approximately equal to the offset for QPSK modulation that is used in the initial frequency calibration and frequency hop protocols. Preferably, in order to communicate over a link having a high loss within the measurement range of the RSSI detector 84, the offset decreases as the RSL decreases.

At a step 230 the RSSI detector 84 takes an RSSI measurement on the selected channel. In the rendezvous protocol the RSSI measurement is taken on the transmit frequency of the channel. In the initial frequency calibration and frequency hop protocols the RSSI measurement is taken on the receive frequency of the channel. At a step 232 when the RSSI measurement is lower than the CCA threshold, the channel is determined to be clear at the step 234. At a step 235 when the RSSI measurement is not lower than the CCA threshold, the channel is determined to be busy and the protocol returns to the step 222 to try the next channel without waiting for the remainder of the specified dwell time to elapse.

At a step 236 when the channel is determined to be clear, the transceivers 21 and/or 22 begin transmitting again and exchanging signals. In a step 238 while the transmitters 21 and 22 are exchanging signals on a channel, the RSSI detector 84 takes the RSL measurements on that channel. Then at a step 240 when no previous RSL is stored or when the new RSL measurement is greater than the previous RSL measurement, the new RSL measurement will be stored. When the new RSL measurement is less than the previous RSL measurement, the previous RSL measurement is retained for that channel.

FIG. 5 is a flow chart of the rendezvous protocol used by the rendezvous protocol code 160 for establishing a communications link. In a step 252 the master transceiver selects a frequency channel pair from the frequency hop table 180. In a step 258 the master transceiver determines whether or not the transmit frequency of the channel is clear or busy as illustrated in FIG. 4b and described in the accompanying detailed description. When the channel is busy, the master transceiver returns to the step 252 for selecting the next channel pair and so on until a channel is found that is clear. In a step 260 when a clear channel has been found, the master transceiver transmits rendezvous handshake signals on its transmit channel frequency at a repetition of about two milliseconds for a relatively long time until a time out occurs at about three hundred milliseconds. The handshake signals include a time stamp for the time that the signals are transmitted and an identification of the slave transceiver for which the signals are intended. In a preferred embodiment the identification is the serial number of the indoor unit 24 of the slave transceiver. Simultaneously, the master transceiver listens on its receive frequency for a responsive handshake signal from the slave transceiver. In a step 262 when the time out occurs before the responsive handshake signal is received from the slave transceiver, the master transceiver returns to the step 252 for selecting the next channel pair and so on until a channel is found that is clear and the responsive handshake signal is received.

Asynchronously, in a step 264 the slave transceiver selects a channel pair from the frequency hop table 180. In general, the channel pair first selected by the slave transceiver will be different than the first channel pair selected by the master transceiver. In a step 266 the slave transceiver listens on the receive frequency for the handshake signal having its identification for a relatively short time of about thirty milliseconds until a time out occurs. In a step 268 when the time out occurs before the handshake signal is received, the slave transceiver returns to the step 264 for selecting the next frequency channel pair and so on until a channel is found where the handshake signal is received.

In a step 274 when the handshake signal has been received the slave transceiver determines whether or not the transmit frequency of the channel is clear or busy as illustrated in FIG. 4b and described in the accompanying detailed description. When the channel is busy, the slave transceiver returns to the step 264 for selecting the next channel pair and so on until a clear channel is found in which the handshake signal was received. In a step 276 when a clear channel has been found, the slave transceiver transmits a responsive handshake signal including the time stamp sent from the master transceiver. By using a relatively long time out for the master transceiver and a relatively short time out for the slave transceiver, eventually the frequency channels of the master and slave transceivers coincide and the link is established. In a step 278 when the responsive handshake signal is received, the master transceiver compares the time stamp to the time of reception and divides by two to determine a one-way transit time FSKTD.

In a step 280 the master transceiver transmits a handshake signal having information for the transit time FSKTD. The master and the slave transceivers each use selected multiples of the transmit time FSKTD as described below for time synchronization between exchanging handshake signals and beginning the QAM acquisition signals, thereby relaxing a requirement that time in one transceiver is the same as time in the other transceiver or has a low relative drift rate. In a step 282 the slave transceiver receives the handshake signal including the transit time FSKTD information. Then, the master and slave transceivers begin a first pass through a frequency channel calibration protocol as illustrated in FIG. 6 and described in the accompanying detailed description.

FIG. 6 is a flow chart of the protocol used by the frequency calibration protocol code 162 for selecting frequency channels for an initial frequency calibration for compensating for frequency errors in the local signals used in generating the transmit frequencies and tuning to the receive frequencies. Two passes through the protocol are required in order to get enough information for calibrating the frequency errors. In the first pass the master and slave transceivers establish a common channel where the master transceiver transmits with an IF channel at the low end of the IF channel frequency range and the slave transmits with an IF channel at the high end of the IF channel frequency range. In the second pass the master and slave transceivers establish a common channel where the master transmits with an IF channel at the high end of the IF channel frequency range and the slave transmits with an IF channel at the low end of the IF channel frequency range. The order of the two passes is not significant. One of the master and slave transceiver transmits on the high RF band and receives on the low RF band and the other transceiver transmits on the low RF band and receives on the high RF band. In respective steps 316 and 318 the master and slave transceiver select a transmit channel having low or high IF frequency depending upon whether it is the first or the second pass. Preferably, in the low channel mode the first choice for the master transceiver IF transmit channel and the slave transceiver IF receive channel is nineteen megahertz, the second is twenty megahertz, and so on. In the high channel mode the first choice for master transceiver IF transmit channel and the slave receiver IF receive channel is sixty megahertz, the second is fifty-nine megahertz, and so on.

In a step 324 the master transceiver determines whether or not the receive frequency of the channel is clear or busy as illustrated in FIG. 4b and described in the accompanying detailed description. When the channel is busy, the master transceiver returns to the step 316 for selecting the next frequency channel and so on until a frequency channel is found that is clear. In a step 326 when a clear channel has been found, the master transceiver transmits several, preferably about three, handshake signals on its transmit channel over a time period of about five milliseconds. Simultaneously, the master transceiver listens on its receive channel for a responsive handshake signals from the slave transceiver.

In a step 332 the slave transceiver determines whether or not the receive frequency of the channel is clear or busy as illustrated in FIG. 4b and described in the accompanying detailed description. When the channel is busy, the slave transceiver returns to the step 318 for selecting the next channel pair and so on until a channel is found that is clear. In a step 334 when a clear channel has been found, the slave transceiver listens at its receive frequency for the handshake signals from the master transceiver. In a step 336 when a time out of about five milliseconds occurs before the handshake signal is received, the slave transceiver returns to the step 318 for selecting the next channel pair without waiting for the specified dwell time to elapse, and so on until a channel is found that is clear and the handshake signal is received. If no handshake signal is received after successively trying about ten clear channels, the slave transceiver returns to the step 264 (FIG. 5) in the rendezvous protocol.

In a step 338 at the time of reception the slave transceiver begins a differential synchronization time for synchronizing the start time before transmitting and receiving the QAM acquisition signals. Preferably, the differential synchronization time for the slave transceiver is about seven times the transit time FSKTD. In a step 339 the slave transceiver transmits a response handshake signal. When the slave transceiver receives another handshake signal after responding, it assumes that the response was lost and it restarts the differential synchronization time and transmits another response handshake signal. Then, in a step 340 when the differential synchronization time has elapsed, the slave transceiver begins transmitting and expecting to receive QAM acquisition signals. In a step 342 when the master transceiver does not receive a response signal within a time out of about five milliseconds it returns to step 316 for selecting the next channel without waiting for the specified dwell time to elapse. If no handshake signal is received after successively trying about ten clear channels, the master transceiver returns to the step 252 (FIG. 5) in the rendezvous protocol. In a step 344 when the response signal is received the master transceiver begins a differential synchronization time to the start time for transmitting and receiving the QAM acquisition signals in a step 345. The differential synchronization time for the slave transceiver is one less increment of the transmit time FSKTD in order to account for the transmit time between sending the responsive handshake signal in the step 339 and receiving it in the step 342.

In the respective steps 340 and 345 the slave and master transceivers exchange signals so that each can acquire a QAM signal from the other and receive a QAM lock indication signal indicating that the other transceiver has acquired the QAM signal. When the master transceiver receives the lock indication from the slave transceiver, the master transceiver uses the QAM signal for sending a time stamp message and receiving the time stamp in return from the slave transceiver and the slave transceiver receives the time stamp and returns it to the master transceiver. Then, the master transceiver computes a one-way QAM transit time QAMTD by dividing the time between transmission and reception by two and uses the QAM signal for sending the transmit time QAMTD in a message to the slave transceiver. The slave transceiver receives the message for the transit time QAMTD and uses the QAM signal for transmitting a response message. The slave transceiver inserts a differential synchronization time of a selected multiple, preferably about four, times the transit time QAMTD between receiving the message and selecting a next channel for either the second pass of the frequency channel selection protocol or the first frequency hop channel. The master transceiver receives the response message and inserts a differential time of a multiple of the transit time QAMTD that is one less than the multiple selected for the slave in order to account for the transit time of the response message by the slave transceiver. The master transceiver sends the message several times and listens for a response. If the slave transceiver receives a second message it assumes that its first response message was not received and it restarts its synchronization and sends a second response message.

In respective steps 350 and 352 when QAM signals cannot be acquired or after about three transmissions for the master or a time out for the slave transceiver the QAM lock indication is not received, the master and slave transceivers return to the respective steps 316 and 318 for selecting the next channel without waiting for the specified dwell time to elapse. If no handshake signal is received after trying about ten channels, the master and slave transceivers return to the respective steps 252 and 264 (FIG. 5) in the rendezvous protocol. When the QAM signals and the QAM lock indications are received, the master and slave transceivers in respective steps 358 and 360 determine whether the second pass has been completed. In respective steps 364 and 366 when only the first pass has been completed the master and slave transceivers store data for the difference between the ideal channel frequency and the adjusted frequency that is used for acquiring the QAM signals and return to the steps 316 and 318, respectively, for the second pass. Then, in respective steps 376 and 378 when the second pass has been completed the master and slave transceivers use the data stored in the respective steps 364 and 366 after the first pass and data for the difference between the ideal channel frequency and the adjusted frequency used for acquiring the QAM signals for the second pass for calculating a frequency slope versus IF channel frequency and a frequency offset for correcting the combination of the frequency errors in receiving the signal in one of the transceivers combined with the frequency errors in transmitting the signal from the other transceiver.

FIG. 7 is a flow chart of the protocol used by the frequency hop protocol code 166 for selecting frequency channels according to the frequency hop table 180 for exchanging payload data. In a step 502 the master selects a current channel having a transmit frequency and a receive frequency from the pseudorandom frequency hop table 180. The table 180 is used repetitively so that when the last channel is used as the current channel, the next channel to be used will be the first channel.

In a step 508 the master transceiver determines whether or not the receive frequency of the current channel is clear or busy as illustrated in FIG. 4b and described in the accompanying detailed description. When the channel is busy, the master transceiver returns to the step 502 for selecting the next frequency channel pair and so on until a channel is found that is clear. In a step 510 when a clear channel has been found, the master transceiver transmits several handshake signals. Preferably the master transmits about three handshake signals at its transmit frequency over a time period of about five milliseconds. Simultaneously, the master transceiver listens on its receive frequency for a responsive handshake signal from the slave transceiver.

In a step 512 the slave transceiver uses the frequency hop table 180 for selecting the same channel having the IF transmit and receive frequencies and RF bands reversed. In a step 518 the slave transceiver determines whether or not the receive frequency of the channel is clear or busy as illustrated in FIG. 4b and described in the accompanying detailed description. When the channel is busy, the slave transceiver returns to the step 512 for selecting the next frequency channel pair and so on until a channel is found that is clear. In a step 520 when a clear channel has been found, the slave transceiver listens on its receive frequency for the handshake signals from the master transceiver. In a step 522 when a time out of about five milliseconds occurs before the handshake signal is received, the slave transceiver returns to the step 512 for selecting the next channel without waiting for the specified dwell time to elapse, and so on until a channel is found that is clear and the handshake signal is received. In a step 524 when the handshake signal is received, the slave transceiver begins a differential synchronization time of about seven times the transmit time FSKTD after receiving the handshake signal before transmitting and expecting to receive QAM acquisition signals. If no handshake signal is received after successively trying about ten clear channels, the slave transceiver returns to the step 264 (FIG. 5) in the rendezvous protocol.

In a step 525 the slave transceiver transmits a response handshake signal. In a step 526 when the differential synchronization time elapses the slave transceiver begins transmitting and receiving QAM acquisition signals. In a step 532 when a time out of about five milliseconds occurs before the responsive handshake signal is received from the slave transceiver, the master transceiver returns to the step 502 for selecting the next channel without waiting for the specified dwell time to elapse, and so on until a channel is found that is clear and the responsive handshake signal is received.

Then, in a step 534 when the handshake signal is received, the master transceiver delays for a differential synchronization time of a selected multiple of the transit time FSKTD that is one less than the multiple selected for the slave transceiver in order to account for the transmit time transmitting the responsive handshake signal from the slave transceiver and receiving it at the master transceiver and then begins the QAM signal acquisition in a step 536. If no handshake signal is received after successively trying about ten clear channels, the master transceiver returns to the step 252 (FIG. 5) in the rendezvous protocol.

In the respective steps 526 and 536 when the differential synchronization times begun in the respective steps 524 or 534 have elapsed the slave and master transceivers simultaneously within a tolerance of about ten to fifty microseconds begin transmitting QAM acquisition signals and begin receiving the acquisition signals after a transit time. The master and slave transceivers exchange signals so that each can acquire a QAM signal from the other and receive a QAM lock indication signal indicating that the other transceiver has acquired the QAM signal. In respective steps 544 and 546 the master and slave transceiver each determines whether it has locked to the QAM acquisition signal from the other. When QAM lock has been achieved, the master and slave transceivers use the QAM signal for sending messages indicating such to the other. In respective steps 548 and 550 when the QAM lock indications are received, the master and slave transceivers use the differential synchronization time QAMTD for refining the timing of the start for exchanging QAM payload data signals based upon the time of receiving QAM lock indications. The slave transceiver receives the QAM lock indication from the master and inserts a differential synchronization time of a selected multiple, preferably about four, times the transit time QAMTD between receiving the message and selecting a next channel for either the second pass of the frequency channel selection protocol or the first frequency hop channel. The master transceiver receives the QAM lock indication signal from the slave and inserts a differential time of a multiple of the transit time QAMTD that is one less than the multiple selected for the slave in order to account for the transmit time for the transmission of the response message by the slave transceiver. The master transceiver sends the QAM lock message several times and listens for a response. If the slave transceiver receives a second message it assumes that its first response message was not received and it restarts its synchronization and sends a second response message. If after about three transmissions for the master or a time out for the slave transceiver the appropriate messages are not received, the master and slave transceivers return to the respective steps 502 and 512 for selecting the next channel without waiting for the specified dwell time to elapse. If the respective QAM lock indications are not received after trying about ten channels, the master and slave transceivers return to the respective steps 252 and 264 (FIG. 5) in the rendezvous protocol.

After successfully exchanging QAM lock indications, the master and slave transceivers exchange QAM signals including payload data. During the exchange of payload data signals, the RSSI detector 84 measures the payload RSL for the signal power and communicates the measurement to the digital section 30. When the new RSL is larger than the previously stored RSL for the current channel, the digital section 30 stores the new RSL in the RSL table 182 for computing the CCA threshold for the next use of the current channel. Alternatively, the RSL that is measured in the current channel may be used for computing the CCA threshold for the next selected channel or some other channel. There is guard band of about five milliseconds and then the master and slave transceivers return to the steps 502 and 512 for frequency hopping to the next channel in a continuous loop.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A communication method, comprising steps of:

listening on a selected channel for an incoming handshake signal having a first type modulation;

demodulating said first type modulation for recognizing said incoming handshake signal; and demodulating an incoming payload data signal having a second type modulation on said selected channel only when said incoming handshake signal is recognized, and wherein:

said incoming handshake signal includes information for a differential synchronization time; and the step of demodulating said incoming payload data signal includes a step of differentially synchronizing to said differential synchronization time.

2. The method of claim 1, wherein:

said step of differentially synchronizing includes steps of differentially timing a reception of an incoming acquisition signal at a time delay of said differential synchronization time after recognition of said handshake signal; and using said incoming acquisition signal for preparing for demodulating said incoming payload data signal.

3. The method of claim 2, wherein:

said differential synchronization time is a multiple of a transit time for said incoming handshake signal.

4. The method of claim 2, wherein:

said second type modulation is quadrature amplitude modulation (QAM) having at least sixteen modulation states.

5. The method of claim 4, wherein:

the step of demodulating said first type modulation includes demodulating said first type modulation without use of a recovered carrier frequency.

6. The method of claim 2, wherein:

said first type modulation is frequency modulation.

7. The method of claim 6, wherein:

said selected channel has a center frequency having a certain channel spacing to a center frequency of an adjacent channel; and said frequency modulation is frequency shift key (FSK) modulation having only two symbol states, said symbol states having a mutual frequency separation of more than one-half said channel spacing.

8. The method of claim 5, wherein:

said first type modulation is phase shift key modulation having no more than four symbol states; and the step of demodulating said incoming handshake signal includes differentially demodulating said phase shift key modulation.

9. The method of claim 2, further including steps of:

modulating said first type modulation for transmitting an outgoing handshake signal on said selected channel; and modulating an outgoing payload data signal having said second type modulation on said selected channel only when said incoming handshake signal is recognized.

10. The method of claim 2, wherein:

said incoming handshake signal includes information for a differential synchronization time; and further including a step of:

differentially synchronizing at a time delay of said differential synchronization time after recognition of said handshake signal for transmitting an outgoing acquisition signal for use for acquiring an outgoing payload data signal having said second type modulation.

11. A communication system, comprising:

a tuner for tuning to a selected channel for receiving an incoming handshake signal having a first type modulation and then an incoming payload data signal having a second type modulation;

a first demodulator coupled to the tuner for demodulating said first type modulation for recognizing said incoming handshake signal; and a second demodulator coupled to the tuner for demodulating said second type modulation only when said incoming handshake signal is recognized, and wherein:

said incoming handshake signal includes information for a differential synchronization time; and further including:

a processing system coupled to the first and second demodulators for differentially time synchronizing the second demodulator according to said differential synchronization time.

12. The system of claim 11, wherein:

the processing system is further for synchronizing the second demodulator at a time delay of said differential synchronization time following recognition of said handshake signal for beginning to receive an incoming acquisition signal and using said incoming acquisition signal for preparing for demodulating said incoming payload data signal.

13. The system of claim 12, wherein:

said differential synchronization time is a multiple of a transit time for said incoming handshake signal.

14. The system of claim 11, wherein:

the second demodulator is a quadrature amplitude modulation (QAM) demodulator for demodulating said second type modulation having at least sixteen modulation states.

15. The system of claim 14, wherein:

the first demodulator is for demodulating said first type modulation without use of a recovered carrier frequency.

16. The system of claim 11, wherein:

the first demodulator includes a frequency demodulator for demodulating said first type modulation as frequency modulation.

17. The system of claim 16, wherein:

said selected channel has a center frequency having a certain channel spacing to a center frequency of an adjacent channel; and said frequency modulation is frequency shift key (FSK) modulation having only two symbol states, said symbol states having a mutual frequency separation of more than one-half said channel spacing.

18. The system of claim 14, wherein:

said first type modulation is phase shift key modulation having no more than four symbol states; and the first demodulator is further for differentially demodulating said phase shift key modulation.

19. The system of claim 11, further including:

a first modulator for modulating said first type modulation for transmitting an outgoing handshake signal; and a second modulator for modulating said second type modulation for transmitting an outgoing payload data signal only when said incoming handshake signal is recognized.

20. The system of claim 11, wherein:

said incoming handshake signal includes information for a differential synchronization time; and further including:

a modulator for generating an outgoing acquisition signal and then an outgoing payload data signal having said second type modulation; and a processing system coupled to the first demodulator and the modulator for differentially time synchronizing the modulator at a time delay of said differential synchronization time after recognition of said handshake signal for generating said outgoing acquisition signal for use by another demodulator for acquiring said outgoing payload data signal.

21. A communication method for meeting spread spectrum regulations by frequency hopping among channels and communicating on each channel for a specified dwell time of about but not greater than a regulated dwell time, comprising steps of:

selecting a current channel;

measuring a received signal strength indication (RSSI) in said current channel;

comparing said RSSI to a threshold;

when said RSSI is greater than said threshold, selecting a next channel without waiting for said specified dwell time to elapse;

listening for a handshake signal in said current channel; and when said handshake signal is not received, selecting said next channel without waiting for said specified dwell time to elapse.

22. The method of claim 21, wherein:

said current channel includes a receive frequency; and the step of measuring said RSSI includes a step of measuring said RSSI corresponding to said receive frequency.

23. The method of claim 21, wherein:

said current channel includes a transmit frequency; and the step of measuring said RSSI includes a step of measuring said RSSI corresponding to said transmit frequency.

24. The method of claim 21, wherein:

the step of selecting said next channel includes selecting said next channel before one-half of said specified dwell time has elapsed.

25. The method of claim 21, further including steps of:

when said handshake signal is received, at least one of (i) transmitting and (ii) receiving an acquisition signal for use for acquiring a payload data signal on said current channel.

26. The method of claim 21, further including steps of:
when said handshake signal is received, transmitting an outgoing acquisition signal;
listening for an incoming lock indication signal indicating that said outgoing acquisition signal was successfully acquired; and
when said incoming lock indication signal is received, transmitting an outgoing payload data signal.

27. The method of claim 21, further including a step of:
computing said threshold from a signal level for a signal received at a previous time.

28. The method of claim 27, wherein:
said threshold is computed from said signal level of said signal received in a previous use of said current channel.

29. A communication system for meeting spread spectrum regulations by frequency hopping among channels and communicating on each channel for a specified dwell time of about but not greater than a regulated dwell time, comprising:
a tuner for selecting a current channel;
a received signal strength indication (RSSI) detector coupled to the tuner for measuring a received signal strength indication (RSSI) in said current channel;
a processing system coupled to the tuner and the RSSI detector for comparing said RSSI to a threshold and when said RSSI is greater than said threshold, causing the tuner to select a next channel without waiting for said specified dwell time to elapse;
a frequency shift key (FSK) demodulator coupled to the tuner for listening for a handshake signal in said current channel; and wherein:
the processing system is further for causing the tuner to select said next channel without waiting for said specified dwell time to elapse when said handshake signal is not received.

30. The system of claim 29, wherein:
the tuner is further for selecting said next channel before one-half of said specified dwell time has elapsed.

31. The system claim 29, wherein:
said current channel includes a receive frequency;
the tuner is further for tuning to said receive frequency; and
the RSSI detector is further for measuring said RSSI corresponding to said receive frequency.

32. The system of claim 29, wherein
said current channel includes a transmit frequency;
the tuner is further for tuning to said transmit frequency; and
the RSSI detector is further for measuring said RSSI corresponding to said transmit frequency.

33. The system of claim 29, wherein:
the tuner is further for selecting said next channel before one-half of said specified dwell time has elapsed when said handshake signal is not received.

34. The system of claim 29, further including:
a quadrature amplitude modulation (QAM) demodulator for receiving an incoming acquisition signal including an incoming lock indication for indicating when an outgoing acquisition signal has been acquired; and
a quadrature amplitude modulation (QAM) modulator coupled to the QAM demodulator and FSK demodulator for generating said outgoing acquisition signal when said handshake signal is received and generating an outgoing payload data signal when said incoming lock indication is received.

35. The system of claim 34, wherein:
the QAM modulator is further for generating said outgoing acquisition signal having an outgoing lock indication when an incoming acquisition signal is acquired; and
the QAM demodulator is further for receiving and acquiring said incoming QAM acquisition signal and demodulating an incoming payload data signal.

36. The system of claim 29, wherein:
the processing system is further for computing said threshold from a signal level for a signal received at a previous time.

37. The system of claim 36, wherein:
said threshold is computed from said signal level of said signal received in a previous use of said current channel.

38. A communication method, comprising steps of:
a) selecting a current channel in a first transceiver;
b) selecting said current channel in a second transceiver;
c) in said first and said second transceiver, measuring a respective received signal strength indication (RSSI) in said current channel;
d) comparing said respective RSSI to a respective threshold in said first and said second transceiver; and
e) when said respective RSSI is greater than said respective threshold in said first transceiver or said second transceiver, returning to the step (a) or the step (b), respectively, for selecting a next channel as said current channel; when said respective RSSI is less than said respective threshold in said first transceiver, transmitting a first handshake signal in said current channel from said first transceiver; and when said respective RSSI is less than said respective threshold in said second transceiver, listening for said first handshake signal in said current channel in said second transceiver.

39. The method of claim 38, further comprising steps of:
f) when said first handshake signal is received in said second transceiver, transmitting a second handshake signal and a second acquisition signal from said second transceiver in said current channel; and when said first handshake signal is not received in said second transceiver, returning to the step (b) for selecting said next channel as said current channel.

40. The method of claim 39, further comprising steps of:
g) when said second handshake signal is received in said first transceiver, transmitting a first acquisition signal in said current channel from said first transceiver; and when said second handshake signal is not received in said first transceiver, returning to the step (a) for selecting said next channel as said current channel.

41. The method of claim 40, further comprising steps of:
h) when said second acquisition signal is acquired in said first transceiver, transmitting a first lock indication signal in said current channel from said first transceiver; when said first acquisition signal is acquired in said second transceiver, transmitting a second lock indication signal in said current channel from said second transceiver; and when said first and said second acquisition signal is not acquired in said second and said first transceiver, respectively, returning to the step (b) or the step (a), respectively, for selecting said next channel as said current channel.

42. The method of claim 41, further comprising steps of:
i) when said first lock indication signal is not received in said second transceiver or said second lock indication is not received in said first transceiver, returning to the step (b) or the step (a), respectively, for selecting said next channel as said current channel.

43. The method of claim 42, further comprising steps of:
j) when said first lock indication signal is received in said second transceiver, measuring a first frequency for said first acquisition signal;
k) when said second lock indication signal is received in said first transceiver, measuring a second frequency for said second acquisition signal.

44. The method of claim 43, further comprising steps of:
(l) after a first pass through the steps (a) through (k), repeating the steps (a) through (k) in a second pass; and
(m) using said first frequency from said first and said second pass for determining a carrier frequency correction for receiving signals in said second transceiver from said first transceiver and using said second frequency from said first and said second pass for determining a carrier frequency correction for receiving signals in said first transceiver from said second transceiver.

45. The method of claim 42, further including steps of:
(n) when said second lock indication signal is received in said first transceiver, transmitting a first payload data signal and receiving a second payload data signal; and
(o) when said first lock indication is received in said second transceiver, transmitting said second payload data signal and receiving said first payload data signal.

46. The method of claim 40, wherein:
said first handshake signal includes a handshake time stamp;
said second handshake signal including a return of said handshake time stamp; and further including steps of:
in said first transceiver, computing a handshake transit time between transmitting and receiving said handshake time stamp;
transmitting a third handshake signal from said first transceiver, said third handshake signal including information for said handshake transit time;
acknowledging receipt of said third handshake signal in said second transceiver by transmitting a fourth handshake signal; and
receiving said fourth handshake signal in said first transceiver.

47. The method of claim 46, wherein:
the step (f) includes differentially synchronizing an initiation of transmitting said second acquisition signal at a particular multiple of said handshake transit time after receiving said third handshake signal; and
the step (g) includes differentially synchronizing an initiation of transmitting said first acquisition signal at a multiple one less than said particular multiple of said handshake transit time after receiving said fourth handshake signal.

48. The method of claim 45, wherein:
before transmitting and receiving said payload signals, the step (n) includes steps of transmitting a first time stamp signal including a payload time stamp; receiving a second time stamp signal having a return of said payload time stamp; computing a payload transit time between transmitting and receiving said time stamp signal in said first transceiver; and transmitting a payload transit time signal including information for said payload transit time; and
before transmitting and receiving payload signals, the step (o) includes receiving said first time stamp signal; transmitting said second time stamp signal; receiving said payload transit time signal; and transmitting an acknowledgment signal.

49. The method of claim 48, wherein:
the step (o) further includes differentially synchronizing an initiation of transmitting and receiving said payload signals at a particular multiple of said payload transit time after receiving said acknowledgment signal; and
the step (n) further includes differentially synchronizing an initiation of transmitting and receiving said payload signals at a multiple one less than said particular multiple of said payload transit time after receiving said payload transit time signal.

* * * * *